United States Patent

Miyake

[11] Patent Number: 6,118,509
[45] Date of Patent: Sep. 12, 2000

[54] LCD HAVING LIGHT SHIELDED PERIPHERY AND TRANSMITTING PORTION TO ENSURE CURING INTERIOR SEALANT OF INJECTION PORT

[75] Inventor: Shiro Miyake, Kumamoto, Japan

[73] Assignee: Advanced Display Inc., Kikuchi-gun, Japan

[21] Appl. No.: 09/261,229

[22] Filed: Mar. 3, 1999

[30] Foreign Application Priority Data

Mar. 6, 1998 [JP] Japan .................................. 10-054798

[51] Int. Cl.⁷ .................................................. G02F 1/1339
[52] U.S. Cl. ............................................. 349/153; 349/190
[58] Field of Search ................................... 349/190, 153, 349/154, 110, 111

[56] References Cited

U.S. PATENT DOCUMENTS

| | | | |
|---|---|---|---|
| 4,494,825 | 1/1985 | Sasaki et al. | 350/343 |
| 4,820,025 | 4/1989 | Nakanowatari | 350/334 |
| 5,867,237 | 2/1999 | Yazaki et al. | 349/86 |

FOREIGN PATENT DOCUMENTS 58-44420  3/1983  Japan .

*Primary Examiner*—Walter Malinowski
*Attorney, Agent, or Firm*—Oblon, Spivak, McClelland, Maier & Neustadt, P.C.

[57] ABSTRACT

A liquid crystal display device comprising a liquid crystal panel, in which there are formed on opposing faces of a pair of substrates a light shield film or a wiring which do not transmit light, a seal member is applied onto the opposing faces for forming an injection port for liquid crystal, and the pair of substrates are adhered together. A sealing material for sealing the injection port is resin that is curable by ultraviolet light or by visible radiation. At least one of the substrates is formed with a transmitting portion through which the ultraviolet light or visible radiation can transmit at a portion in the proximity of the injection port of the light shield film or wiring. Even if sealing material has penetrated between a pair of substrates, it can be cured by irradiated ultraviolet light or visible radiation by the provision of a transmitting portion, and dispersion of uncured sealing material into liquid crystal can be prevented.

12 Claims, 7 Drawing Sheets

LCD HAVING LIGHT SHIELDED PERIPHERY AND TRANSMITTING PORTION TO ENSURE CURING INTERIOR SEALANT OF INJECTION PORT

BACKGROUND OF THE INVENTION

The present invention relates to a liquid crystal display device. More particularly, it relates to a liquid crystal display device which prevents sealing material from being uncured and presents high reliability even if a light shield film or wiring is provided in the proximity of an injection port for obtaining a high performance.

Figure 8:
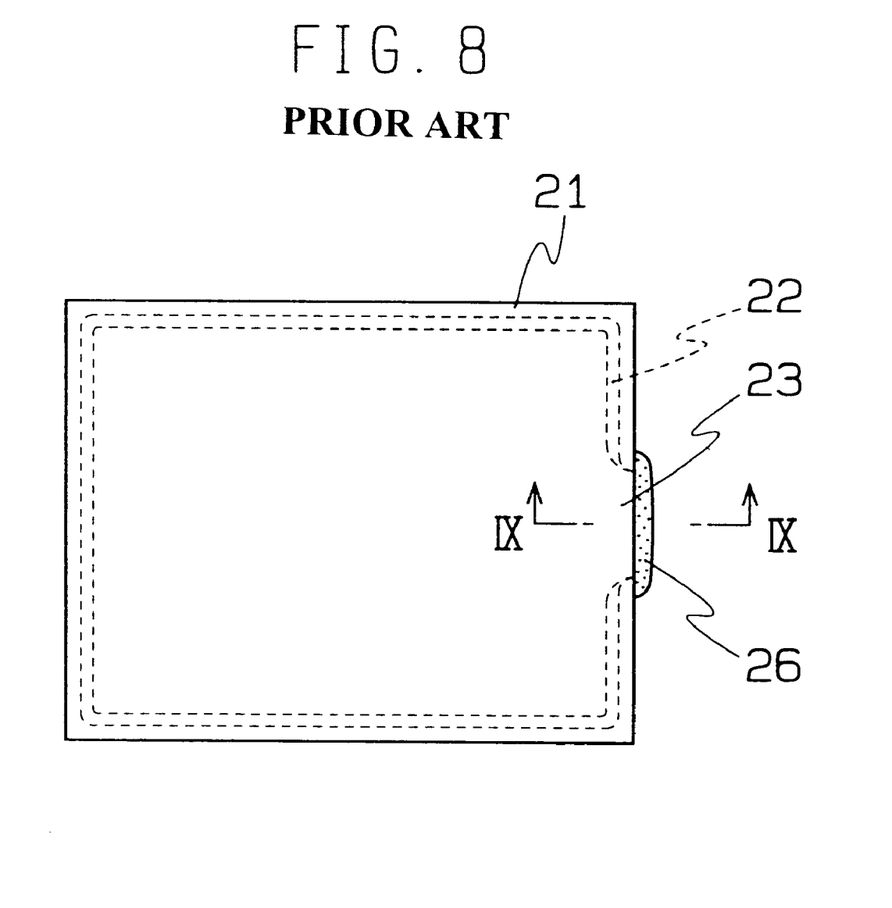
FIG. 8 is a plan view of a conventional liquid crystal display device.
Figure 9:
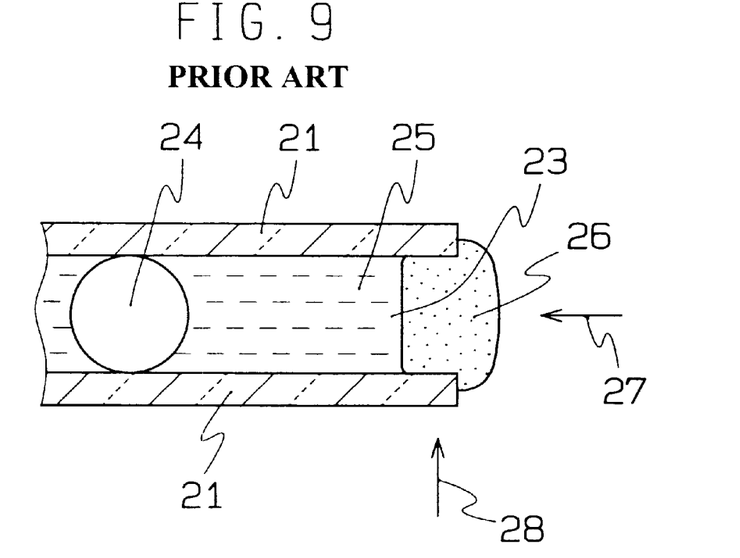
FIG. 9 is a sectional view taken along the line IX—IX of FIG. 8.

FIGS. 8 and 9 show diagrams of a device as disclosed, for instance, in Japanese Unexamined Patent Publication No. 44420/1983 as an example of a conventional liquid crystal device. Of these drawings, FIG. 8 is a plan view showing an arrangement of a conventional liquid crystal device, and FIG. 9 is a sectional view taken along the line IX—IX in FIG. 8.

In FIGS. 8 and 9, 21 denotes a pair of glass substrates on which there are formed transparent electrodes and metal wiring (not shown) on opposing face sides, 22 a seal material made of resin for adhering the pair of glass substrates 21 together, 23 an injection port formed at a part of the seal material 22 for injecting liquid crystal 25 therein, 24 spacer spread for maintaining a clearance between the pair of glass substances 21 constant, 25 liquid crystal injected into the clearance between the pair of glass substances 21, and 26 a sealing material provided for preventing leakage of the liquid crystal 25.

As for a material for the sealing material 26, UV curable resin might be employed as shown in Japanese Unexamined Patent Publication No. 44420/1983 in view of increasing throughput during the sealing process and the pot life (working life after mixing) of the material. As shown in FIG. 9, after application of the sealing material 26, a lamp generating ultraviolet light is employed for irradiating ultraviolet light in a direction as indicated by arrow 27 to perform curing of the sealing material 26 made of resin.

After application, the sealing material 26 is made to penetrate into the clearance between the pair of glass substrates 21 by means of capillary action with the aim of improving the sealing effects thereof so that it generally assumes a condition as shown in FIG. 9 in which the sealing material has penetrated between the two glass substrates 21. In FIG. 9, the part of the sealing material 26 that has penetrated between the pair of glass substrates 21 is cured by ultraviolet light 28 that comes around from a lateral direction (upper or lower direction in FIG. 9). In this manner, the part at which the sealing material 26 has penetrated presents high performance of sealing off an aperture of the injection port 23 whereby not only leakage of liquid crystal from the interior of the liquid crystal display device can be prevented but also high effects of preventing penetration of water or the like from the exterior can be obtained. Therefore, in order to improve the reliability of the device, the sealing material is positively made to penetrate between the glass substrate in manufacturing of liquid crystal display devices. Generally, such penetrating distance is adjusted to be approximately 0.1 to 1 mm.

Figure 10:
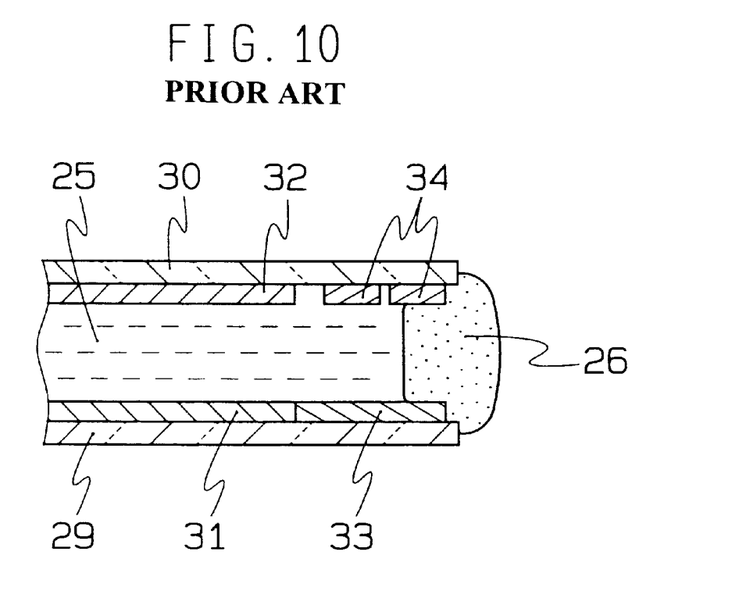
FIG. 10 is a sectional view of a conventional color liquid crystal display device.

Latest liquid crystal display devices of high performance are of arrangements as shown, for instance, in FIG. 10. 29 denotes a color filter substrate on which there is formed a color filter layer 31 for applying color to the display, and 30 a TFT substrate on which there is formed a thin film transistor. Further, since it is not desirable that light is transmitted through regions other than a display portion 32, a light shield film 33 employing chromium thin film or the like is formed in peripheral portions of one substrate 29 on regions other than the display portion. Especially in a TFT-LCD color liquid crystal display device as shown in FIG. 10 employing a substrate having formed thereon thin film transistor and a color filter substrate, such formation of light shield film is inevitable, and the light shield film is generally formed on the side of the color filter substrate.

On the other TFT substrate 30 having no light shield film formed thereon, there is formed a metal wiring 34 for signals driving the liquid crystal 25. Since the latest liquid crystal display devices of high performance are designed such that the size of the display portion with respect to the frame size is set to be maximum, the distance between the display portion and the circumferential line of the liquid crystal panel is small. Further, at a portion of the injection port of the liquid crystal display device, there is created a portion at which the sealing material 26 is sandwiched between the light shield film 33 and the metal wiring 34.

In this manner, in case the sealing material 26 has penetrated between the pair of glass substrates 29, 30 and at least a part of the sealing material 26 is sandwiched between films which do not transmit light such as the light shield film 33 or metal wiring 34, ultraviolet light or visible radiation can not be irradiated onto this sandwiched portion in an amount sufficient for curing so that some sealing material remains in an uncured condition. This uncured sealing material is in contact with liquid crystal, and during long-term use of the liquid crystal display device, the uncured sealing material gradually disperses into the liquid crystal, and the liquid crystal containing the dispersed sealing material therein causes degradations in voltage-transmittance characteristics or characteristics such as resistivity. Consequently, it caused degradations in display performance in the proximity of the injection port, or more particularly, local variations in luminance. Since especially a decrease in resistivity would cause fatal deficiencies in case of a TFT-LCD, it is necessary that sufficient curing of the sealing material is ensured.

Figure 11:
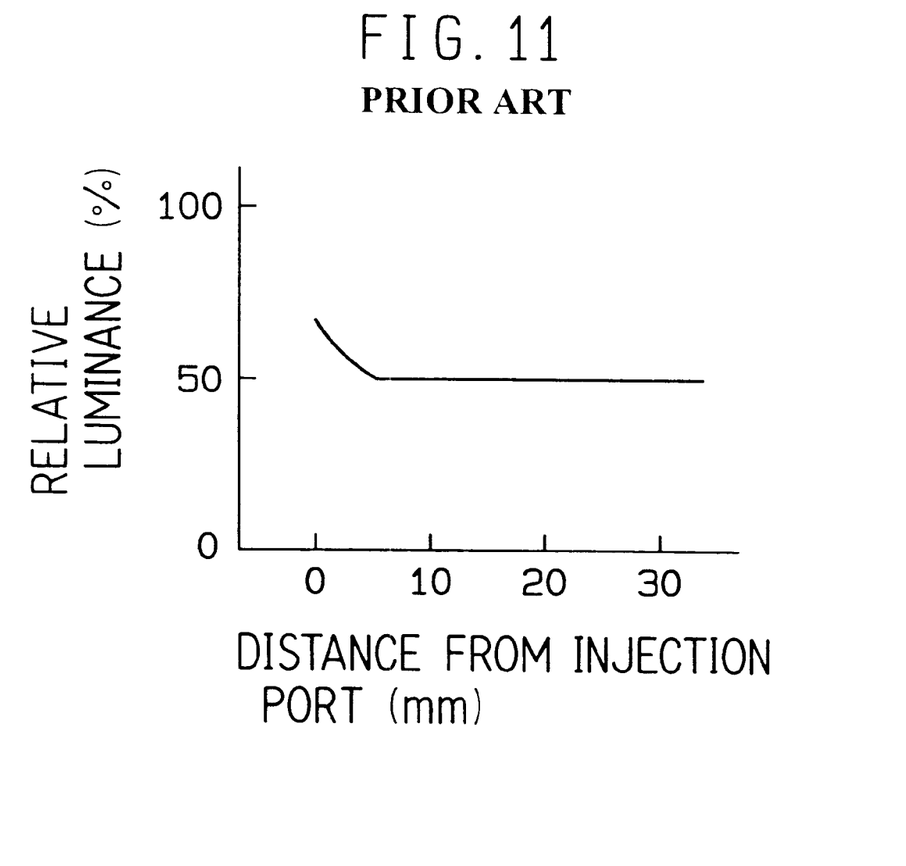
FIG. 11 is a graph showing distribution of luminance in a proximity of an injection port of a conventional color liquid crystal display device.

For instance, FIG. 11 shows an example of luminance distribution of a liquid crystal panel in which the sealing material at the injection port has remained in an uncured condition. It can be understood from FIG. 11 that the luminance is partially higher in the proximity of the injection port of the liquid crystal panel. This is due to the fact that the resistivity of the liquid crystal has decreased at a portion in the proximity of the injection port.

The present invention has been made for solving such problems, and it is an object thereof to provide a liquid crystal display device of high reliability by making sealing material that has penetrated between a pair of glass substrates cure without remaining any uncured portions in order to prevent occurrence of display deficiencies owing to uncured sealing material.

SUMMARY OF THE INVENTION

In accordance with the present invention, there is provided a liquid crystal display device comprising a liquid crystal panel, in which there are formed on opposing faces of a pair of substrates a light shield film or a wiring which do not transmit light, a seal member is applied onto the opposing faces for forming an injection port for liquid crystal, and the pair of substrates are adhered together, wherein a sealing material for sealing the injection port is resin that is curable by ultraviolet light or by visible radiation, at least a part of the resin is drawn between the pair of substrates, and at least one of the substrates is formed with a transmitting portion through which the ultraviolet light or visible radiation can transmit at a portion in the proximity of the injection port of the light shield film or wiring.

It is desirable that a degree of aperture of the transmitting portion is not less than 20%.

It is desirable that the transmitting portion is a notch formed at a portion in the proximity of the injection port of the light shield film or wiring.

It is desirable that the transmitting portion is an aperture formed by going around of the wiring at a portion in the proximity of the injection port of the wiring.

It is desirable that the transmitting portion is composed of a plurality of portions.

It is desirable that the transmitting portion is a clearance between two adjoining wiring of the wiring.

It is desirable that a degree of aperture of the clearance is not less than 20%, and that a degree of aperture of the clearance of a portion remote from the injection port is not more than 20%.

It is desirable that a portion in the proximity of the injection port of the wiring is partially narrowed in width.

It is desirable that the transmitting portion is an aperture of circular or polygonal shape formed in the light shield film or wiring.

It is desirable that the transmitting portion is inside an aperture formed in the light shield film or wiring and is a region outside a dot-like or strip-like pattern formed inside the aperture.

DETAILED DESCRIPTION

The liquid crystal display device of the present invention will now be explained in details with references to the drawings.

EMBODIMENT 1

Figure 1:
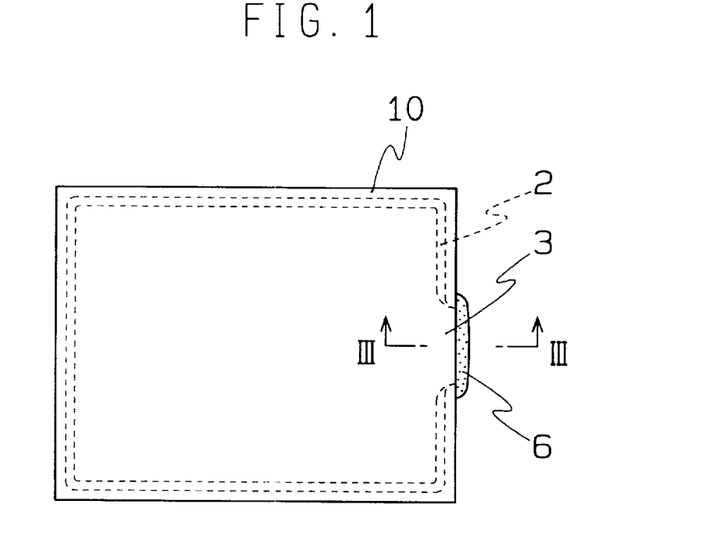
FIG. 1 is a plan, explanatory view showing an embodiment of a liquid crystal display device of the present invention.
Figure 2:
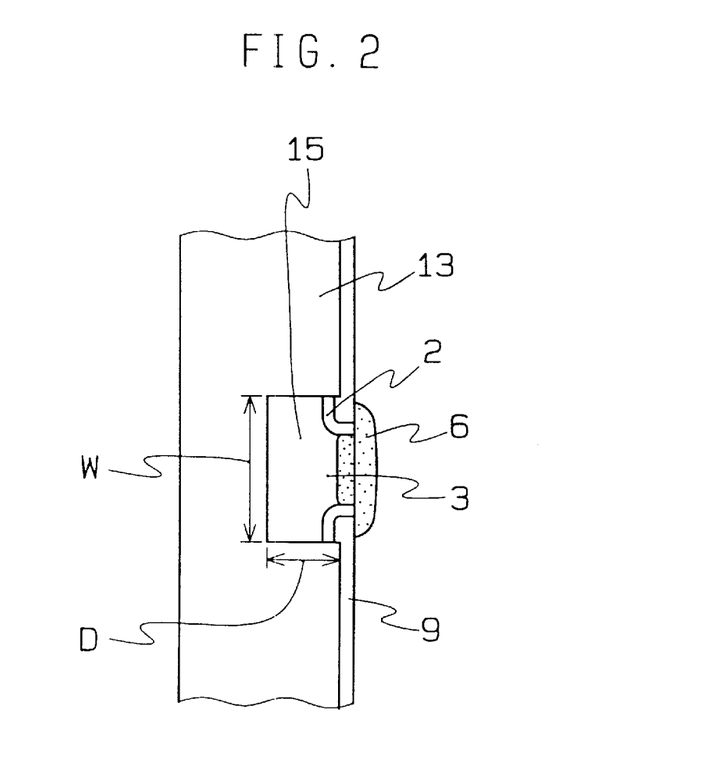
FIG. 2 is an enlarged view of a proximity of an injection port in FIG. 1.
Figure 3:
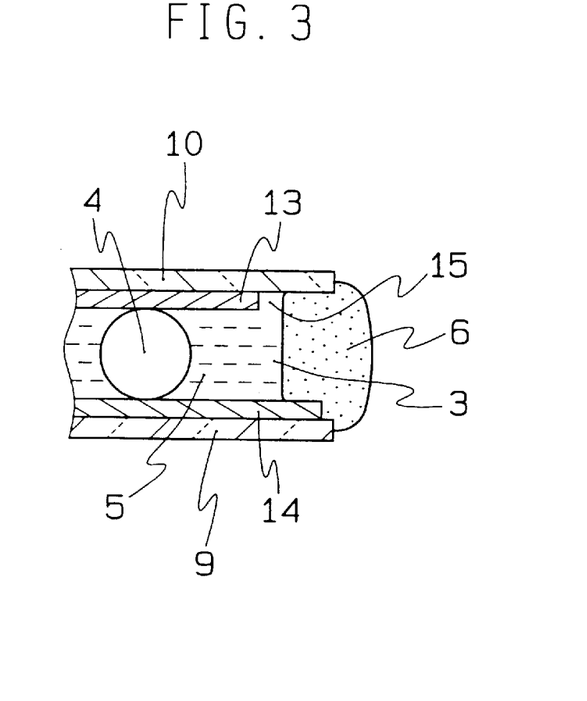
FIG. 3 is a sectional view taken along the line III—III of FIG. 1.

FIGS. 1 to 3 show a liquid crystal display device having a notch 15 for transmitting ultraviolet light or light. In the drawings, 9, 10 denote a pair of glass substrates on which opposing face sides there are formed a light shield film 13 and a wiring 14 that do not transmit light. Further, in FIGS. 1 to 3, 2 denotes a seal material made of resin for adhering the pair of glass substrates 9, 10 together, 3 an injection port formed at a portion of the seal material 2 for injecting liquid crystal 5, 4 spacer spread for maintaining a clearance between the pair of glass substrates 9, 10 constant, 5 liquid crystal injected into the clearance between the pair of glass substrates 9, 10 and 6 a sealing material provided for preventing leakage of liquid crystal 5.

The sealing material 6 is resin that is curable by irradiating ultraviolet light or visible radiation, and, for example, UV curable acrylic resin or UV curable epoxy resin can be used.

The wiring 14 comprises an aluminum thin film wiring of a thickness of approximately 1,000 Å provided for providing electric connection between a signal cable at one end portion of the glass substrate 9 and a signal cable at the other end thereof on, for instance, an upper surface of the glass substrate 9.

The light shield film 13 comprises a chromium thin film of a thickness of approximately 1,000 Å provided for preventing transmission of unnecessary light through the pair of glass substrates 9, 10 that is provided, for instance, on a lower side of the glass substrate 10.

As shown in FIGS. 2 and 3, a notch 15 is formed at a portion in the proximity of the injection port 3 in the light shield film 13 as a transmitting portion for making ultraviolet light or visible radiation transmit therethrough.

By providing the notch 15 as to assume a size through which ultraviolet light or visible radiation irradiated from outside can be sufficiently irradiated onto a portion at which the sealing material 6 has penetrated between the substrates, for instance, to assume a size in which a width of the notch W is approximately 20 mm and a depth of the notch D is approximately 2 mm, ultraviolet light or visible radiation can be sufficiently irradiated on a portion at which the sealing material 6 has penetrated between the substrates (substantially 100% of the light can be irradiated).

Using the liquid crystal panel having an injection port as described above, after injecting liquid crystal materials, an UV curable resin such as 3052 (product name: manufactured by Kabushiki Kaisha Three Bond) is employed as the sealing material 6 for sealing the injection port by controlling the amount of penetration into the injection port to be not less than 0.05 mm, and preferably approximately 1 mm. Thereafter, by irradiating ultraviolet light in an amount of approximately 5000 mj, sealing material that has protruded out to the exterior of the substrate and sealing material that has penetrated between the substrates can be completely cured.

Figure 7:
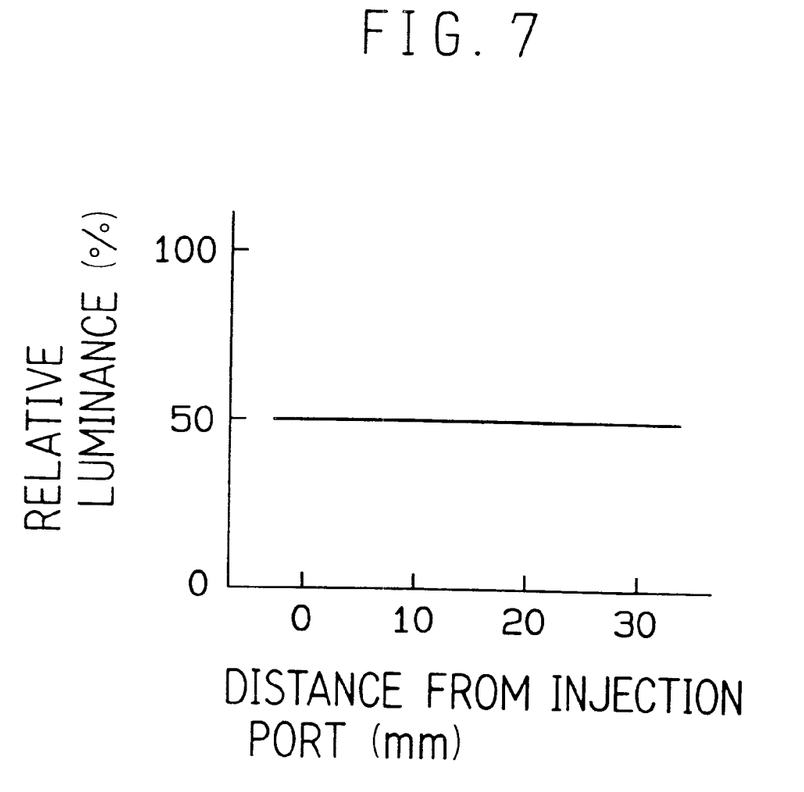
FIG. 7 is a graph showing distribution of luminance in the proximity of the injection port of the liquid crystal display device of FIG. 1.

FIG. 7 shows a graph of measuring results of luminance distribution of a liquid crystal display panel having the notch 15. As it is evident from the graph of FIG. 7, the luminance is uniform also in the proximity of the injection port of the liquid crystal panel, and that the resistivity of the liquid crystal is maintained normal in the proximity of the injection port.

It should be noted that the same effects can be obtained when a notch is formed in the wiring 14 instead of forming the notch 15 in the light shield film 13.

EMBODIMENT 2

Figure 4:
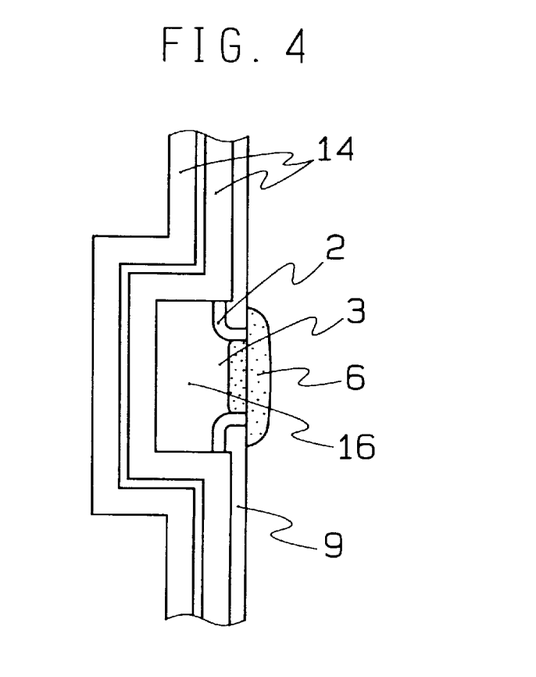
FIG. 4 is an enlarged view showing a proximity of an injection port of a liquid crystal display device according to another embodiment of a liquid crystal display device of the present invention in which wiring has made to go around.

FIG. 4 shows an example in which an aperture 16 that serves as a transmitting portion has been formed by making a wiring 14 go around a region in which sealing material 6 penetrates into a clearance between substrates (corresponding to the clearance between the glass substrates 9, 10 of FIG. 3 as described above). By making the wiring 14 go around the region of the sealing material 6 in this manner, an aperture required for making ultraviolet light or visible radiation transmit can be secured. It should be noted that the remaining points are identical with those of the preceding Embodiment 1.

EMBODIMENT 3

In case wiring 14 can not be formed as to go around as described in the preceding Embodiment 2 due to any restrictions of design, an aperture required for making ultraviolet light or visible radiation transmit can be secured by designing, considering the amount of irradiation of ultraviolet light, the width of the wiring such that a degree of aperture of a transmitting portion through which ultraviolet light or visible radiation is made to be not less than 20% with respect to a portion onto which light is irradiated (that is, a light shielded area is less than 80%). It should be noted that the remaining points are identical with those of the preceding Embodiment 1.

EMBODIMENT 4

While it has been explained of a case in the preceding Embodiment 3 in which the width and clearance between wiring can be freely designed, it might happen that no sufficient degree of aperture can be secured in case of a large-sized liquid crystal panel in which the width of wiring is required to be large in order to decrease the wiring resistance for the sake of normal transmission of driving signals. In such a case, the degree of aperture of a clearance between adjoining wiring in the proximity of the injection port shall be set to be not less than 20% and the degree of aperture of the clearance at a portion remote from the injection port shall be set to be not more than 20%.

Figure 5:
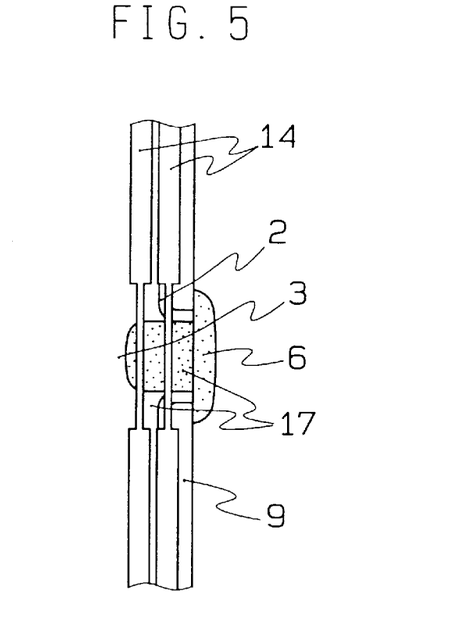
FIG. 5 is an enlarged view showing a proximity of an injection port of a liquid crystal display device according to still another embodiment of a liquid crystal display device of the present invention in which wiring has partially made to be narrow.

More particularly, by partially making the wiring 14 narrow only in the proximity of a region in which a sealing material 6 penetrates into a clearance between substrates (corresponding to the clearance between the substance 9, 10 of the above described FIG. 3) in the proximity of injection port 3, a plurality of clearances 17 of a minimum required number for the irradiation of ultraviolet light or visible radiation can be secured, and consequently, the sealing material 6 that has penetrated between the substrates can be cured. It should be noted that the remaining points are identical with those of the preceding Embodiment 1.

EMBODIMENT 5

Though not shown in the drawings, there can be secured a plurality of apertures of a minimum required number for the irradiation of ultraviolet light or visible radiation by forming circular or polygonal apertures in the light shield film 13 or wiring 14 in the proximity of the injection port 3 as the transmitting portion. Consequently, the sealing material 6 that has penetrated between the substrates can be cured. It should be noted that the remaining points are identical with those of the preceding Embodiment 1.

EMBODIMENT 6

Figure 6:
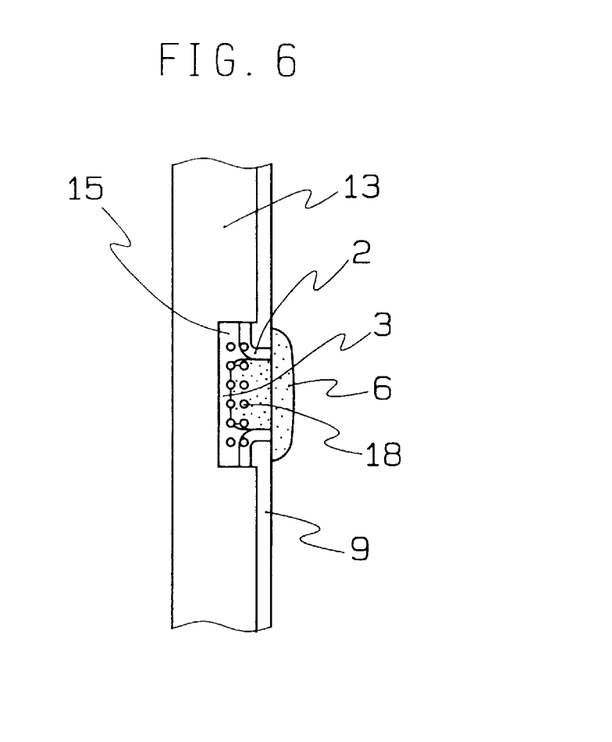
FIG. 6 is an enlarged view showing a proximity of an injection port of a liquid crystal display device according to yet another embodiment of a liquid crystal display device of the present invention in which the device has dot-like patterns.

Since the notch 15 is formed in the light shield film 13 in the case of Embodiment 1, deficiencies in a distance between a pair of substrates of a liquid crystal panel, that is, in a gap thereof might occur at the notch 15 or in the proximity thereof. This is due to the fact that by forming a notch in the light shield film 13, a difference in level corresponding to the film thickness of the light shield film 13 is generated whereby the gap is made small. In order to cope with such an inconvenience, it is effective to leave dot-like or strip-like patterns 18 in the light shield film 13 as shown in FIG. 6 at a ratio such that the degree of aperture with respect to portions on which light is irradiated to be not less than 20% (that is, a light shielded area is less than 80%) for making the gap within the notch 15 formed in the light shield film 13 uniform.

In this Embodiment 6, the transmitting portion is formed inside the notch 15 and in a region outside the dot-like or strip-like pattern 18. The remaining points are identical with those of the preceding Embodiment 1.

Further, in this Embodiment 6, the same effects can be obtained by providing a notch and patterns in the wiring 14 instead of forming a notch 15 and dot-like or strip-like patterns 18 in the light shield film 13.

As explained so far, the liquid crystal display device according to the present invention can be suitably applied to latest color liquid crystal display devices of high performance in which wiring and light shield films are required to be formed at narrow regions other than display regions.

According to the invention of claim 1, even if sealing material has penetrated between a pair of substrates, it can be cured by irradiated ultraviolet light or visible radiation by the provision of a transmitting portion, and dispersion of uncured sealing material into liquid crystal can be prevented. Consequently, the luminance of the liquid crystal panel can be prevented from becoming not uniform.

According to the inventions of claims 5 to 8, even if sealing material has penetrated between a pair of substrates in a liquid crystal display panel including a non-transparent portion such as metal wiring, it can be cured by irradiated ultraviolet light or visible radiation by the provision of a plurality of minute transmitting portions, and dispersion of uncured sealing material into liquid crystal can be prevented. Consequently, the luminance of the liquid crystal panel can be prevented from becoming not uniform.

Especially, according to the inventions of claims 7 and 8, both dispersion of uncured sealing material into liquid crystal can be prevented and securing of wiring having sufficiently low resistivity for driving the liquid crystal is made possible.

According to the invention of claim 10, dispersion of uncured sealing material into liquid crystal can be prevented and uniformity of gaps between the pair of substances can be secured by the dot-like or strip-like patterns.

What is claimed is:

1. A liquid crystal display device, comprising:
   a liquid crystal panel having opposing faces;
   a pair of substrates each including a non-light transmitting portion formed on the opposing faces of said liquid crystal panel;
   a seal member applied onto the opposing faces in order to form an injection port for liquid crystal;
   a sealant curable by ultraviolet light or visible radiation and configured to seal the injection port wherein at least an interior portion of the sealant is provided between the pair of non-light transmitting portions; and one of said substrates further including a transmitting portion situated such that said interior portion of the sealant provided between the pair of non-light transmitting portions can be cured by incident radiation.

2. The liquid crystal device of claim 1, wherein the transmitting portion is an aperture having a size not less than 20% of a light shielded area provided by the substrate which includes the transmitting portion.

3. The crystal device of claim 1, wherein the transmitting portion is a notch formed in either one of said substrates.

4. The liquid crystal device of claim 1, wherein the transmitting portion is an aperture formed by forming wiring around the sealant in proximity to the injection port.

5. The liquid crystal display device according to claim 1, wherein said sealant is a resin.

6. The liquid crystal display device according to claim 1, wherein one of said pair of non-light transmitting portions comprises a light shielding film and the other of said pair of non-light transmitting portions comprises wiring.

7. The liquid crystal device of claim 6, wherein the transmitting portion is inside an aperture formed in the light shielding film or wiring and is a region outside a dot-like or strip-like pattern formed inside the aperture.

8. The liquid crystal device of claim 6, wherein the transmitting portion comprises a plurality of portions.

9. The liquid crystal device of claim 8, wherein the transmitting portion is an aperture of circular or polygonal shape formed in the light shielding film or wiring.

10. The liquid crystal device of claim 8, wherein the transmitting portion is a clearance between two adjoining wiring of the wiring.

11. The liquid crystal device of claim 10, wherein a degree of aperture of the clearance is not less than 20%, and a degree of aperture of the clearance of a portion remote from the injection port is not more than 20%.

12. The liquid crystal device of claim 11, wherein a portion of said plurality of portions in proximity to the injection port is partially narrowed in width.

* * * * *